(12) United States Patent
Darling

(10) Patent No.: US 10,944,108 B2
(45) Date of Patent: Mar. 9, 2021

(54) GRAPHITE-CONTAINING ELECTRODE AND METHOD RELATED THERETO

(71) Applicant: Robert Mason Darling, South Windsor, CT (US)

(72) Inventor: Robert Mason Darling, South Windsor, CT (US)

(73) Assignee: Raytheon Technologies Corporation, Waltham, MA (US)

( * ) Notice: Subject to any disclaimer, the term of this patent is extended or adjusted under 35 U.S.C. 154(b) by 627 days.

(21) Appl. No.: 14/652,131

(22) PCT Filed: Dec. 23, 2012

(86) PCT No.: PCT/US2012/071549
§ 371 (c)(1),
(2) Date: Jun. 15, 2015

(87) PCT Pub. No.: WO2014/098918
PCT Pub. Date: Jun. 26, 2014

(65) Prior Publication Data
US 2015/0340709 A1     Nov. 26, 2015

(51) Int. Cl.
*H01M 4/96* (2006.01)
*H01M 8/20* (2006.01)
*H01M 4/86* (2006.01)
*H01M 8/18* (2006.01)
(Continued)

(52) U.S. Cl.
CPC ......... *H01M 4/583* (2013.01); *H01M 4/8605* (2013.01); *H01M 4/8615* (2013.01); *H01M 4/8652* (2013.01); *H01M 4/8885* (2013.01); *H01M 4/96* (2013.01); *H01M 8/188* (2013.01); *H01M 8/20* (2013.01); *Y02E 60/50* (2013.01)

(58) Field of Classification Search
CPC combination set(s) only.
See application file for complete search history.

(56) References Cited

U.S. PATENT DOCUMENTS

| | | |
|---|---|---|
| 5,028,500 A | 7/1991 | Fong et al. |
| 5,792,577 A | 8/1998 | Ejiri et al. |
| 6,287,729 B1 | 9/2001 | Tamaki et al. |

(Continued)

FOREIGN PATENT DOCUMENTS

| | | |
|---|---|---|
| EP | 1011161 | 6/2000 |
| JP | 06111818 | 4/1994 |

(Continued)

OTHER PUBLICATIONS

International Search Report for PCT Application No. PCT/US2012/071549 completed Feb. 25, 2013.

(Continued)

*Primary Examiner* — Imran Akram
(74) *Attorney, Agent, or Firm* — Carlson, Gaskey & Olds, P.C.

(57) ABSTRACT

A graphite-containing electrode includes a porous body that has a plurality of first graphite-containing elements and a plurality of second graphite-containing elements intermingled with the first graphite-containing elements. The first graphite-containing elements have a first degree of graphitization and the second graphite-containing elements have a second, different degree of graphitization.

11 Claims, 2 Drawing Sheets

(51) Int. Cl.
*H01M 4/583* (2010.01)
*H01M 4/88* (2006.01)

(56) References Cited

U.S. PATENT DOCUMENTS

| | | | |
|---|---|---|---|
| 7,648,788 B2 | 1/2010 | Yamamoto | |
| 2002/0192539 A1* | 12/2002 | Kobayashi | H01M 4/8605 429/480 |
| 2004/0229125 A1 | 11/2004 | Zou et al. | |
| 2008/0063915 A1* | 3/2008 | Yamamoto | H01M 4/92 429/483 |
| 2011/0193014 A1 | 8/2011 | Sotowa et al. | |
| 2011/0256435 A1 | 10/2011 | Kim et al. | |

FOREIGN PATENT DOCUMENTS

| | | |
|---|---|---|
| JP | 2000268878 | 9/2000 |
| JP | 2002141071 | 5/2002 |
| JP | 2004127913 | 4/2004 |
| JP | 2007335163 | 12/2007 |
| JP | 2009193910 | 8/2009 |
| WO | 94/06164 | 3/1994 |
| WO | 2005008811 | 1/2005 |
| WO | 2012097164 | 7/2012 |

OTHER PUBLICATIONS

Shen, W., Zhijie, L., Yihong, L. (2007). Surface chemical functional groups modification of porous carbon. Recent Patents on Chemical Engineering 2008, 1, 27-40.

European Search Report for European Patent Application No. 12890260.8 completed Sep. 28, 2015.

European Search Report for European Application No. 18193820.0, dated Oct. 23, 2018.

M. Beatriz Vasquez-Santos et al: Comparative of PBO-Derived Carbon Fibers Journal of Physical Chemistry C, vol. 116, No. 1, Nov. 22, 2011 (Nov. 22, 2011), pp. 257-268, XP055515942, ISSN: 1932-7447; DOI: 10.1021;ip2084499 *abstract* *4. Discussion*.

Frank R. Feret: Determination of the crystallinity of calcined and praphitic cokes by X-ray diffraction, The Analyst, vol. 123, No. 4, Apr. 1, 1998 (Apr. 1, 1998). pp. 595-600, XP055339808, ISSN: 0003-2654, DOI: 10,1039/a707845r *sections "Experimental results" and "Degree of graphitization (DOG)" p. 598 and 599*.

* cited by examiner

GRAPHITE-CONTAINING ELECTRODE AND METHOD RELATED THERETO

STATEMENT REGARDING FEDERALLY SPONSORED RESEARCH OR DEVELOPMENT

This invention was made with government support under Contract No. DE-AR0000149 awarded by the Department of Energy. The Government has certain rights in this invention.

BACKGROUND

Flow batteries, also known as redox flow batteries or redox flow cells, are designed to convert electrical energy into chemical energy that can be stored and later released when there is demand. As an example, a flow battery may be used with a renewable energy system, such as a wind-powered system, to store energy that exceeds consumer demand and later release that energy when there is greater demand.

A typical flow battery includes a redox flow cell that has a negative electrode and a positive electrode separated by an electrolyte layer, which may include a separator, such as an ion-exchange membrane. A negative fluid electrolyte (sometimes referred to as the anolyte) is delivered to the negative electrode and a positive fluid electrolyte (sometimes referred to as the catholyte) is delivered to the positive electrode to drive electrochemically reversible redox reactions. Upon charging, the electrical energy supplied causes a chemical reduction reaction in one electrolyte and an oxidation reaction in the other electrolyte. The separator prevents the electrolytes from rapidly mixing but permits selected ions to pass through to complete the redox reactions. Upon discharge, the chemical energy contained in the liquid electrolytes is released in the reverse reactions and electrical energy can be drawn from the electrodes. Flow batteries are distinguished from other electrochemical devices by, inter alia, the use of externally-supplied, fluid electrolyte solutions that include reactants that participate in reversible electrochemical reactions.

SUMMARY

Disclosed is a graphite-containing electrode that includes a porous body that has a plurality of first graphite-containing elements and a plurality of second graphite-containing elements intermingled with the first graphite-containing elements. The first graphite-containing elements have a first degree of graphitization and the second graphite-containing elements have a second, different degree of graphitization. Also disclosed is an electrochemical device that includes the graphite-containing electrode.

Also disclosed is a method of fabricating a graphite-containing electrode. The method includes providing a plurality of first graphite-containing elements and a plurality of second graphite-containing elements. The first graphite-containing elements have a first degree of graphitization and the second graphite-containing elements have a second, different degree of graphitization. The first graphite-containing elements and the second graphite-containing elements are treated with an oxidizer to provide oxygen-containing sites bonded on the surfaces of the first graphite-containing elements and the second graphite-containing elements

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
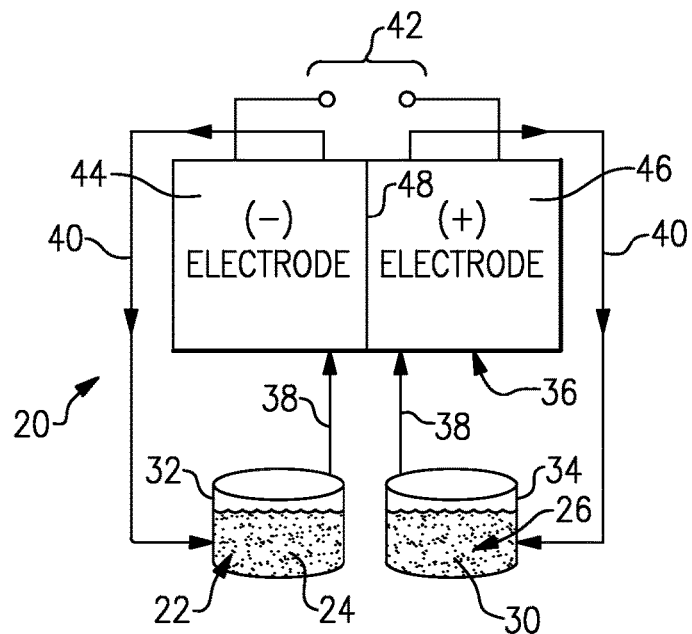
FIG. 1 illustrates an example electrochemical device.

FIG. 1 schematically illustrates selected portions of an example electrochemical device, which in this example is a flow battery 20 for selectively storing and discharging electrical energy. The flow battery 20 can be used to convert electrical energy generated in a renewable energy system to chemical energy that is stored until a later time when there is greater demand at which the flow battery 20 then converts the chemical energy back into electrical energy. The flow battery 20 can supply the electric energy to an electric grid, for example. As will be described, the disclosed flow battery 20 includes features for enhanced stability.

The flow battery 20 includes at least one liquid electrolyte 22 that has at least one electrochemically active species 24 that functions in a redox pair with regard to a second reactant 26, which can be another liquid electrolyte with at least one electrochemically active specie 30, or any other electrochemically active specie such as hydrogen or oxygen, for example. For example, the electrochemically active species are based on vanadium, bromine, iron, chromium, zinc, cerium, lead, sulfur or combinations thereof. In embodiments, the liquid electrolytes 22/26 are solutions that include one or more of the electrochemically active species 24/30.

The fluid electrolytes 22/26 are contained in respective storage portions 32 and 34, such as tanks. As shown, the storage portions 32 and 34 are substantially equivalent cylindrical storage tanks; however, the storage portions 32/34 can alternatively have other shapes and sizes.

The fluid electrolytes 22/26 are delivered (e.g., pumped) to one or more electrochemical cells 36 of the flow battery 20 through respective feed lines 38 and are returned from the electrochemical cell 36 to the storage portions 32/34 via return lines 40. Thus, the storage portions 32/34 are external of the electrochemical cell 36 and are fluidly connected with the electrochemical cell 36 to circulate the liquid electrolytes 22/26 there through.

In operation, the fluid electrolytes 22/26 are delivered to the electrochemical cell 36 to either convert electrical energy into chemical energy or convert chemical energy into electrical energy that can be discharged. The electrical energy is transmitted to and from the electrochemical cell 36 through an electrical pathway 42 that completes the circuit and allows the completion of the electrochemical redox reactions.

The electrochemical cell 36 includes a first electrode 44 and a second electrode 46. A separator 48, such as an ion-exchange membrane, is arranged between, and in contact with, the electrodes 44/46. In this example, the first electrode 44 is a negative electrode and the second electrode 46 is a positive electrode. Although not shown, the electrochemical cell 36 can include bipolar plates with flow field channels for delivering the fluid electrolytes 22/26 to the electrodes 44/46. Alternatively, the electrochemical cell 36 can be configured for "flow-through" operation where the fluid electrolytes 22/26 are pumped directly into the electrodes 44/46 without the use of flow field channels.

The electrodes 44/46 can be porous carbon-based materials that are electrically conductive and electrochemically active for the desired redox reactions. As an example, one or both of the electrodes 44/46 include fibrous carbon paper or felt materials that have an electrochemically active surface.

Figures 2, 3:
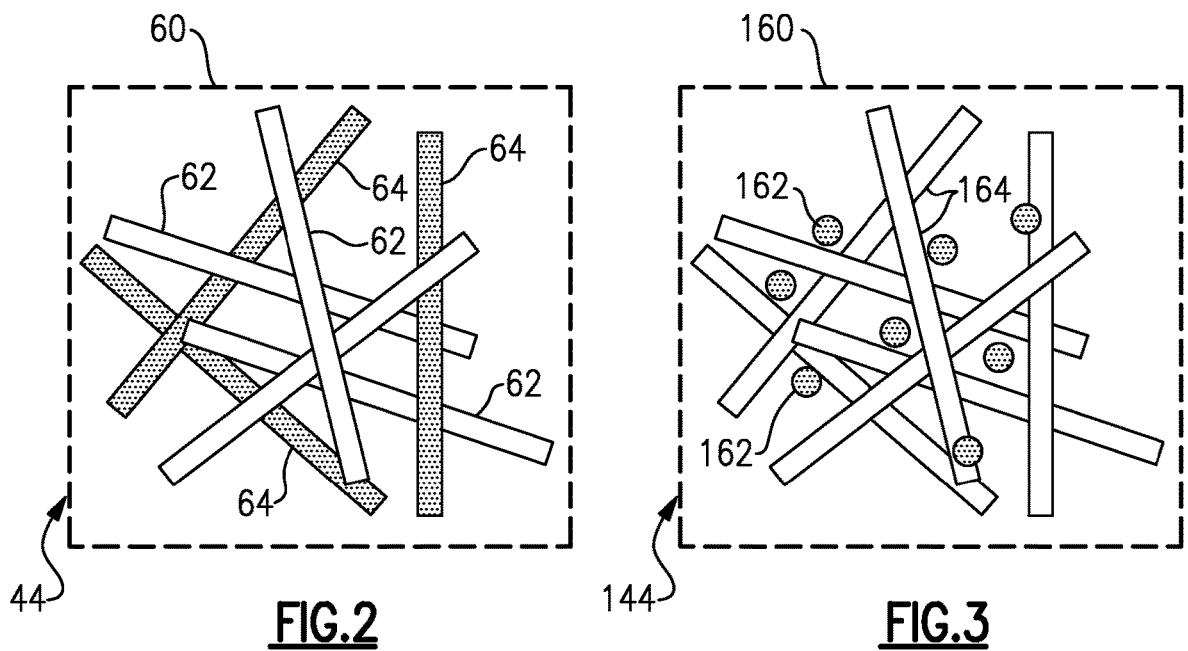
FIG. 2 illustrates an example of a porous body of a graphite-containing electrode.
FIG. 3 illustrates another example of a porous body of a graphite-containing electrode.

Referring to FIG. 2, a portion of the electrode 44 is shown. It is to be understood that the examples herein can also represent the electrode 46. In this example, the electrode 44 includes a porous body 60. The porous body 60 can be a sheet that is relatively thin in comparison to its width and length but is not limited to sheets.

In this example, the porous body 60 is a fibrous structure that includes a plurality of first graphite-containing elements 62 and a plurality of second graphite-containing elements 64 (shaded) that are intermingled with the first graphite-containing elements 62. In this example, both the first graphite-containing elements 62 and the second graphite-containing elements 64 are fibers. For example, the fiber has a uniform diameter along its length and is elongated with regard its diameter.

The first graphite-containing elements 62 have a first degree of graphitization and the second graphite-containing element 64 have a second, different degree of graphitization. For example, at least the first graphite-containing elements 62 include portions that are graphite and portions of non-graphite carbon, such as amorphous carbon. The second graphite-containing elements 64 can be all or substantially all graphite, or can also include portions of non-graphite carbon, such as amorphous carbon.

Without being bound by any particular theory, the degree of graphitization of the first and second graphite-containing elements 62/64 is believed to ultimately influence the chemical and electrochemical stability of the electrode 44 in electrochemical devices, such as the flow battery 20. As an example, a graphite electrode can be treated in an oxidizer to activate the surfaces for electrochemical activity with the reactants, such as the fluid electrolytes 22/26. The treatment produces oxygen-containing sites on the carbon surface, at least some of which participate in the catalysis of the electrochemical reactions of the active species. The degree of graphitization influences the amount of oxygen containing surface groups produced in the activation treatment, the type and amount of chemically different oxygen containing surface groups produced in the activation treatment, or both.

The oxygen-containing sites can chemically or electrochemically reduce (i.e., decay) over time due to exposure to voltage cycling during operation of the electrochemical device, and thus electrochemical performance diminishes. However, the decay can be influenced by adjusting the degree of graphitization to control the amount of oxygen containing surface groups produced in the activation treatment and/or the type and amount of chemically different oxygen-containing surface groups. For example, the degree of graphitization influences a decay rate. A lower degree of graphitization provides a lower decay rate (i.e., greater stability) while a greater degree of graphitization provides a relatively higher decay rate (i.e., lower stability). For example, decay rate can be represented as a slope of a trend of average voltage versus number of cycles over a given operating range. This trend can be compared for different electrodes by plotting, for example, voltage loss per cycle versus thermal conductivity of electrode, because thermal conductivity is a proxy for degree of graphitization.

The degree of graphitization also influences other properties, such as electrical conductivity, thermal conductivity and strength. Accordingly, although a lower degree of graphitization may be desired for lower decay and greater stability, electrodes of electrochemical devices can also require a good balance with the other properties. In this regard, the electrode 44 having the first graphite-containing elements 62 with the first degree of graphitization and the second graphite-containing element 64 with the second degree of graphitization provides a combination of good stability imparted by the first graphite-containing elements 62 with other desirable properties imparted by the second graphite-containing elements 64.

In one example, the first degree of graphitization is 20%, and the second degree of graphitization is 40%. In another example, the degrees of graphitization differ by at least 25%. In a further example, the porous body 60 has, by weight, 20% of the first graphite-containing elements 62 and 80% of the second graphite-containing elements 64.

FIG. 3 shows another example electrode 144 having a porous body 160. In this disclosure, like reference numerals designate like elements where appropriate and reference numerals with the addition of one-hundred or multiples thereof designate modified elements that are understood to incorporate the same features and benefits of the corresponding elements. In this example, the first graphite-containing elements 162 are non-fiber particles 162 and the second graphite-containing elements 164 are fibers. In one example, the non-fiber particles do not have a uniform diameter and are thus distinguishable from fibers. The non-fiber particles can be coated onto the surfaces of the fibers or reside interstitially in voids between the fibers.

Figure 4:
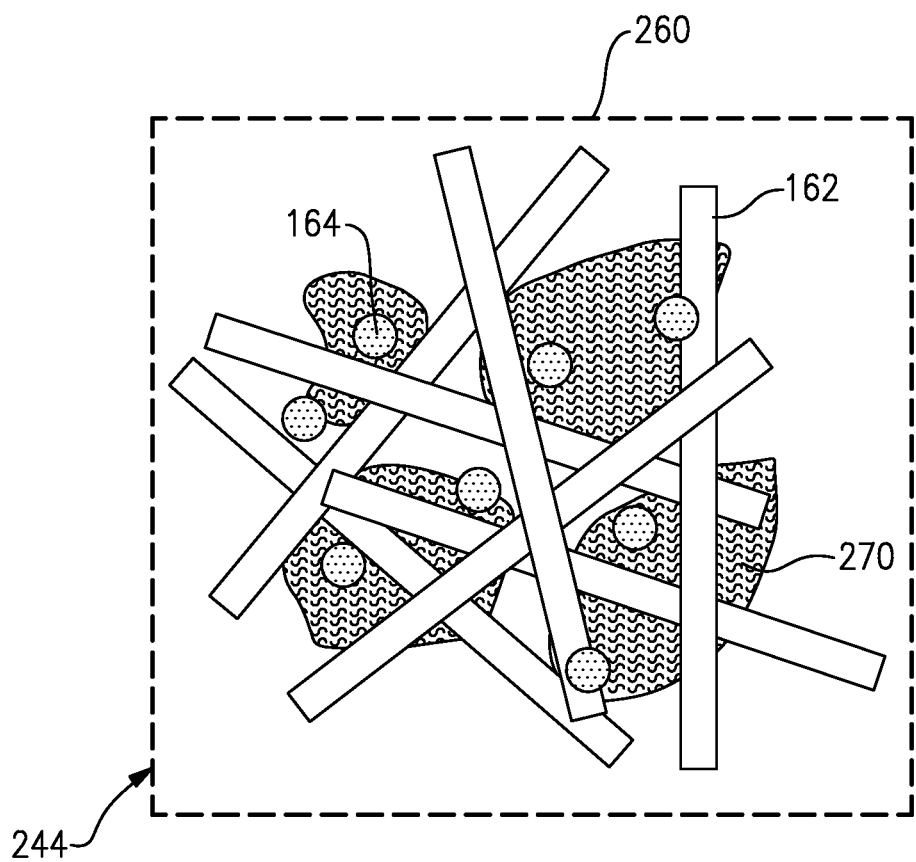
FIG. 4 illustrates another example of a porous body of a graphite-containing electrode.

FIG. 4 shows another example electrode 244, which is a modified version of the electrode 144. In this example, the electrode 244 further includes a binder 270, such as phenolic resin, that holds the first and second graphite-containing elements 162/164 together. In other examples that do not have the binder 270, the graphite-containing elements may be self-adhering.

The electrodes 44/144/244 also embody a method of fabrication. For example, the method includes providing the first graphite-containing elements 62/162 and the second graphite-containing elements 64/164. As described above, the first graphite-containing elements 62/162 and the second graphite-containing elements 64/164 have differing degrees of graphitization. The first graphite-containing elements 62/162 and the second graphite-containing elements 64/164 are then treated with an oxidizer to produce carbon containing surface groups on the surfaces thereof. The treatment can include exposing the first graphite-containing elements 62/162 and the second graphite-containing elements 64/164 to an acid, heating the first graphite-containing elements 62/162 and the second graphite-containing elements 64/164 in oxidizer, such as air, or a combination thereof. It is to be understood, however, that other treatments can additionally or alternatively be used.

As discussed above, due to the difference in degree of graphitization, the amount of oxygen-containing surface groups produced in the treatment and/or the type and amount of chemically different surface groups produced in the treatment differs between the first graphite-containing elements 62/162 and the second graphite-containing elements 64/164. In a further example, the first graphite-containing elements 62/162 and the second graphite-containing elements 64/164 are intermingled to form the porous body 60/160/260, such as a sheet, and then treated to oxidize the surfaces thereof. The formation of sheets or other fibrous structures is known and is therefore not further discussed herein.

The degree of graphitization of the first graphite-containing elements 62/162 and the second graphite-containing elements 64/164 can be adjusted by controlling a temperature at which the elements are graphitized. For example, the first graphite-containing elements 62/162 and the second graphite-containing elements 64/164 are each fabricated from known carbon starting materials. The carbon starting material is then heated in an environment free or substantially free of oxygen to convert the carbon from one form, such as an amorphous form, to graphite. The temperature and time at which the carbon starting material is treated can be adjusted to control the degree of graphitization. Accordingly, by treating the first graphite-containing elements 62/162 at a first condition with regard to temperature and time and treating the second graphite-containing elements 64/164 at a second, different condition, differing degrees of graphitization can be produced. Alternatively, or in addition to the selected conditions, different carbon starting materials can also be used to influence the degree of graphitization.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A graphite-containing electrode comprising:
a porous body including a plurality of first graphite-containing elements and a plurality of second graphite-containing elements intermingled with the plurality of first graphite-containing elements, the plurality of first graphite-containing elements having a first degree of graphitization and the plurality of second graphite-containing elements having a second, different degree of graphitization, wherein the first degree of graphitization differs from the second degree of graphitization by 25%, wherein the degree of graphitization is an amount of graphite in the graphite-containing elements, wherein one of the plurality of first graphite-containing elements and the plurality of second graphite-containing elements include portions that are amorphous carbon.

2. The graphite-containing electrode as recited in claim 1, wherein the plurality of first graphite-containing elements and the plurality of second graphite-containing elements are fibers.

3. The graphite-containing electrode as recited in claim 2, wherein the fibers have a length, and a uniform diameter along the length, and the fibers are elongated with regard to the diameter.

4. The graphite-containing electrode as recited in claim 1, wherein the plurality of first graphite-containing elements are non-fiber particles and the plurality of second graphite-containing elements are fibers.

5. The graphite-containing electrode as recited in claim 4, wherein the non-fiber particles have a non-uniform diameter.

6. The graphite-containing electrode as recited in claim 4, wherein the non-fiber particles are coated onto the surfaces of the fibers.

7. The graphite-containing electrode as recited in claim 4, wherein the non-fiber particles reside interstitially in voids.

8. The graphite-containing electrode as recited in claim 1, further comprising a binder holding the plurality of first graphite-containing elements and the plurality of second graphite-containing elements together.

9. The graphite-containing electrode as recited in claim 1, further comprising oxygen-containing groups on a surface of the porous body.

10. A graphite-containing electrode comprising:
a porous body including a plurality of first graphite-containing elements and a plurality of second graphite-containing elements intermingled with the plurality of first graphite-containing elements, the plurality of first graphite-containing elements having a first degree of graphitization and the plurality of second graphite-containing elements having a second, different degree of graphitization, wherein the first degree of graphitization is 20%, and the second degree of graphitization is 40%, and wherein one of the plurality of first graphite-containing elements and the plurality of second graphite-containing elements include portions that are amorphous carbon.

11. The graphite-containing electrode as recited in claim 10, wherein the porous body includes, by weight, 20% of the plurality of first graphite-containing elements and 80% of the plurality of second graphite-containing elements.

* * * * *